United States Patent [19]
Daniell et al.

[11] Patent Number: 5,229,956
[45] Date of Patent: Jul. 20, 1993

[54] HELICOPTER WEIGHT MEASUREMENT

[75] Inventors: John G. B. Daniell, Huntington; George A. Molnar, Orange, both of Conn.

[73] Assignee: United Technologies Corporation, Hartford, Conn.

[21] Appl. No.: 665,061

[22] Filed: Mar. 6, 1991

[51] Int. Cl.$^5$ .................. G01G 9/00; G06F 15/20
[52] U.S. Cl. .................. 364/567; 244/17.11; 340/946; 364/424.06; 364/506
[58] Field of Search .......... 364/571.01–571.08, 364/567, 550, 506, 508, 424.06, 434; 244/17.11, 17.13; 340/946, 971

[56] References Cited
U.S. PATENT DOCUMENTS

| | | | |
|---|---|---|---|
| 3,754,440 | 8/1973 | Edgerton et al. | 364/506 X |
| 4,143,364 | 3/1979 | Dlugos | 364/567 X |
| 4,300,200 | 11/1981 | Doe | 364/565 |
| 4,312,042 | 1/1982 | Bateman | 364/567 X |
| 4,574,360 | 3/1986 | Bateman | 364/567 |
| 4,658,639 | 4/1987 | Arnberg | 364/506 X |
| 4,780,838 | 10/1988 | Adelson | 364/567 |
| 4,870,412 | 9/1989 | Vuichard | 364/434 X |
| 4,894,787 | 1/1990 | Flannelly et al. | 364/550 X |

*Primary Examiner*—Kevin J. Teska
*Attorney, Agent, or Firm*—Gerald L. DePardo

[57] ABSTRACT

A weight measurement system calculates the gross vehicle weight of a helicopter while in hover or level unaccelerated forward flight by measuring and averaging the distances 20,22 between the fuselage 24 and the underside of each main rotor blade 26 at the front and rear of the fuselage 24, measuring the main rotor speed, and correcting for the effects of vertical and horizontal drag forces on the fuselage due to the spinning rotor and forward velocity, respectively, using predetermined vehicle calibration data. An inhibit signal 54 may also be provided to the weight calculation logic to disable the weight calculation when the vehicle is in a flight regime not suitable for accurate weight measurement.

15 Claims, 1 Drawing Sheet

HELICOPTER WEIGHT MEASUREMENT

TECHNICAL FIELD

This invention relates to weight measurement and more particularly to measuring the weight of a helicopter while in flight.

BACKGROUND ART

It is known in the art that the weight of an aircraft on the ground can be measured by various means. For example, the weight of a fixed wing aircraft is typically measured on the ground by weight scales or by a weight on wheels (WOW) device, or in the case of a helicopter, weight is typically determined by manually tracking fuel, cargo, and passenger weight.

For fixed wing aircraft, a change in weight after takeoff is primarily due to fuel consumption, therefore, automatic weight tracking can be easily performed by known means. However, a helicopter can have significant weight changes imposed on the vehicle once in flight, and without landing again, by on-loading and off-loading passengers, e.g., ground troops, by lifting external loads, e.g., land vehicles, or by in-flight refueling or fuel dumping. These unique requirements render conventional techniques of weight sensing inadequate and necessitate a method for accurately determining the weight of the helicopter while in flight.

In a helicopter, there are certain components, e.g., rotor shaft, pitch control horn, and rotor head spindle, that experience stress which varies due to aircraft weight and other factors. Tracking these stresses over time aids in determining the useful life of these components. Direct monitoring of such components by strain gages or similar devices is impractical because of the need for slip ring apparatus which is inherently complex and prone to failure. However, accurately knowing the gross weight of the vehicle along with other flight parameters allows the calculation of stress, and thus the calculation of useful (or safe) life of the aforementioned components. Knowing the safe life of these components helps avoid the cost of premature maintenance and the hazards of breakdown during operation.

Additionally, the ability to sustain a hover (i.e. maintaining steady level flight with no vertical or horizontal motion) varies as a function of flight parameters such as air density, temperature, and vehicle weight. For example, at a given altitude, temperature, and gross weight, the helicopter may have no difficulty sustaining a hover. However, if the altitude or temperature increases, the air density will decrease and a hover may not be sustainable at the new condition. Therefore, accurate weight measurement during flight also allows a wider range of mission profiles, passenger or equipment deployment, and hover maneuvers within the permissible flight envelope.

DISCLOSURE OF INVENTION

Objects of the invention include provision of weight measurement in a helicopter which provides vehicle weight continuously during flight and is unaffected by altitude, temperature, or other aerodynamic load changes but reacts dynamically to physical load changes as helicopter weight varies.

According to the present invention, the gross weight of a helicopter is determined by employing noncontacting distance measuring sensors to measure distances from known points on the vehicle fuselage to the underside of the rotor blades, and calculating the gross vehicle weight from these distances and other flight information.

The invention avoids requiring the flight crew to monitor and track weight changes and performs this function more accurately and efficiently. Furthermore, the invention represents a significant improvement over previous methods of determining vehicle weight by providing accurate weight measurement continuously during flight and reacting immediately to on-loading or off-loading weight.

The foregoing and other objects, features and advantages of the present invention will become more apparent in the light of the following detailed description of exemplary embodiments thereof, as illustrated in the accompanying drawings.

BEST MODE FOR CARRYING OUT THE INVENTION

Figures 1, 2, 3:
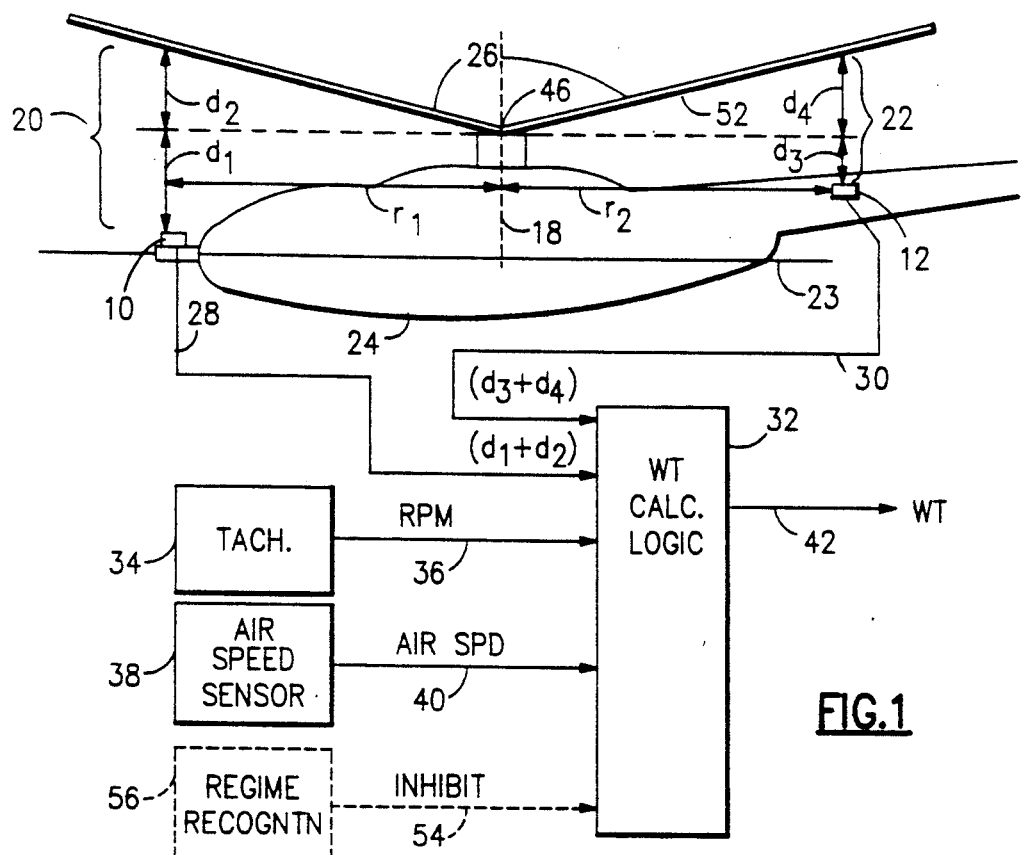
FIG. 1 is a schematic block diagram of a helicopter weight measurement system of the invention employing distance measuring devices.
FIG. 2 is a free body diagram showing the balance of forces on a rotor blade.
FIG. 3 is a side view of a helicopter showing an alternative mounting configuration for the distance sensors used in accordance with the present invention.

Referring to FIG. 1, a helicopter weight measurement system includes at least two distance measuring devices 10,12 located known distances $r1,r2$ from the main rotor shaft 18, which measure the vertical distances 20,22 perpendicular to the vehicle centerline 23 from known points on the fuselage 24 to the underside of a plurality of rotating main rotor blades 26. The distance measuring devices (distance sensors) may be any known device capable of measuring the distance from one object to another that does not require physical touching, e.g. a laser diode device such as a Mitsubishi Laser Diode, Model No. ML3101. A laser diode device, as is known, transmits a beam of coherent light and detects light of the same type which is reflected back (also known as optical backscatter). The sensors should be able to detect a low level of returning light to allow for light absorption by the rotor blades, which are typically composed of fiberglass or aluminum and covered with an epoxy paint exhibiting a dull finish. The distance sensors provide analog electrical signals proportional to the distance measured, i.e., when a blade is directly above the sensor the output voltage will be proportional to the distance to the blade and when there is no blade over the sensor (no reflection) the output will be zero volts.

The distance sensors 10,12 provide distance signals continuously on two lines 28,30, respectively, to weight calculation logic 32. The electrical signals provided by the sensors may be amplified to increase signal strength and filtered to remove signal noise prior to being coupled to the output lines 28,30. The weight calculation logic 32 consists of a peak detector for each distance sensor (i.e., a known circuit which charges to and holds the largest voltage that it sees) responsive to the analog distance signal, and an analog to digital converter (A/D), responsive to the peak detectors, which converts the peak voltages to digital bits representing the distances measured. When the A/D takes a sample, the peak detector is reset to allow the next peak voltage to be measured and held. To allow every blade pass to be sampled, the A/D sample rate for each sensor is set faster than the maximum rotor speed multiplied by the number of blades.

A rotor speed signal is provided by a known tachometer 34, which provides an analog voltage proportional to main rotor speed, to the weight calculation logic on a line 36. Additionally, an airspeed sensor 38, e.g., a pitostatic sensor that determines airspeed from static pressure and total ram pressure created by forward velocity, provides an analog voltage signal proportional to the forward airspeed of the vehicle on a line 40 to the weight calculation logic 32. An analog multiplexer may be employed within the weight calculation logic 32 to switch between analog input signals. The logic 32 also contains known signal processing components capable of performing mathematical operations (e.g., digital adders, multipliers, and table look-ups), responsive to the digital bits from the A/D converter. The output of the weight calculation logic provides a signal on a line 42 indicative of gross vehicle weight corrected for non-ideal (real-world) helicopter effects.

The distance from a sensor to each passing blade will vary slightly depending on the blade "track". Blade track is the term used to describe how well the tip paths of the rotor blades track each other and is a function of the individual blade pitch. It is known that if two blades do not track each other, the vertical lift force produced by one blade will be different from that of the other. Consequently, the distance from the fuselage the blades may vary from one blade to the next, giving varying distance sensor readings. To eliminate such variation, the distances are continuously sampled and averaged by the weight calculation logic 32 using known signal processing hardware, over a period of time, e.g., 5 seconds.

The two sensors 10,12 are mounted known distances d1,d3 below the point of rotation of the rotor blades 46 (i.e., the point where the rotor blades are connected to the rotor shaft, also known as the rotor head). The distances d1,d3 are subtracted from the distances 20,22 measured by the respective sensor, yielding the distances d2,d4. The distances d2,d4 are averaged to cancel the effects of vehicle pitch and rotor tilt (e.g., occurring in forward flight). If the horizontal distances r1,r2 from the two sensors to the main rotor shaft 18 are not identical, a common horizontal distance must be selected and the vertical distances scaled to that point before the two vertical distances d2,d4 are averaged. To scale the two vertical distances d2,d4 to a common horizontal distance, the vertical distance measured by the sensor closest to the rotor shaft 18 is multiplied by the ratio of the larger to the smaller distance to the rotor shaft. For example, if r1 is less than r2, the vertical distance d2 is scaled to a value equivalent to that of a sensor mounted a horizontal distance r2 from the rotor shaft, by the following relationship:

$$d2sc = d2 \cdot r2/r1 \qquad (eq.\ 1)$$

where d2sc is the scaled vertical distance value to be used in averaging the two vertical distances. This scaling must be performed after the distances d1,d3 are subtracted from the distances 20,22 measured by the sensors.

It is known in the art that the angle formed relative to the horizontal, by the rotor blades in rotation as seen when the helicopter is viewed from the side, is related to the weight of the helicopter. This angle is also known as the "coning angle" 52. The coning angle 52 changes by only approximately 6 degrees from flat pitch to the pitch associated with lifting the maximum gross weight of the vehicle. Therefore, a device which measures the angle directly would be prone to inaccuracies due to insufficient resolution. Instead, the invention (as previously described) measures the vertical distances from two points located on the vehicle fuselage, one being forward of the rotor shaft and the other being aft of the shaft, to the rotor blades. More than two points may be used if desired, however, information regarding vehicle roll may also be required if more than two points are utilized. The points chosen on the fuselage should be as close as possible to the end (tip) of the blade to maximize sensitivity and accuracy of the weight calculation.

Referring now to FIG. 2, it is known that the average coning angle $\beta$ of all the blades is related to the total weight (W) lifted, by the following relationship:

$$\text{Tan } (\beta) = (n \cdot L)/(n \cdot F) = W/(n \cdot F) = d/r \qquad (eq.\ 2)$$

where n is the number of blades; L is the aerodynamic lift produced by one blade; F is the force exerted by the centripetal acceleration of a blade in rotation (i.e., centripetal or radial force); d is the corrected averaged vertical distance from the rotor hub to the underside of the spinning main rotor blades; and r is the horizontal distance from aforementioned common measurement point on the fuselage to the main rotor shaft.

Solving eq. 2 for W and adding the static weight of all the blades B gives the ideal (theoretical) total vehicle weight as follows:

$$W = n \cdot F \cdot d/r + B \qquad (eq.\ 3)$$

where:

$$F = \omega^2 \cdot x \cdot m \qquad (eq.\ 4)$$

where $\omega$ is the variable rotor speed (in radians per second); x is the distance along the blade from the center of mass 94 of the blade to the center of rotation 46; and m is the mass of the rotor blade.

The weight of each blade is assumed to be evenly distributed along its length, and the blade is assumed to be infinitely stiff. Therefore, a coning angle of approximately zero degrees exists when there is no weight suspended from the rotor hub. The weight obtained from eq. 3 is the weight of an ideal helicopter having no correction for non-ideal effects such as horizontal or vertical drag, or uneven blade weight distribution. The weight calculation logic of FIG. 1 uses eqs. 3 and 4 together with the measured rotor speed signal on the line 36 to calculate the ideal weight of the helicopter.

It is known that the vertical drag (or rotor "downwash" effect) of a vehicle is the downward force on the fuselage created by downward airflow from the spinning rotor. This downward force acts in a direction opposite to that which the rotor is attempting to lift, thereby making the vehicle appear heavier than it actually is. Therefore, this force must be compensated for when calculating vehicle weight.

To correct for vertical drag effects, a vehicle must first be calibrated to determine its vertical drag characteristics. Each different vehicle type having a unique fuselage and blade design must be calibrated. However, a vehicle need not be recalibrated unless a change is made that affects the vertical drag, e.g., a change in the rotor blades, or a change in the size or shape of the fuselage or attachments thereto.

Calibration of the vertical drag force is performed, using known techniques, by plotting the actual weight of the vehicle against the ideal weight calculated by eqs. 3 and 4 at various different rotor speeds (e.g., 95%, 100%, and 105%), and at various different vehicle weights (e.g., 6,000 to 10,000 lbs in increments of 500 lbs) induced by lifting against a short cable with a load cell (i.e., a device capable of measuring cable tension) attached to an anchor point ("dead man") on the ground. Different values or more values of rotor speed and vehicle weight maybe used if desired.

Referring to FIG. 1, the weight calculation logic 32 calculates the ideal weight by eqs. 3 and 4 and corrects the ideal weight for vertical drag using the measured rotor speed signal on the line 36, and a bivariate (two inputs one output) table look-up derived from the aforementioned vertical drag calibration of the vehicle. The inputs to the table are rotor speed, and the ideal weight calculated from eqs. 3 and 4. The output of the table, actual vehicle weight corrected for vertical drag, is linearly interpolated by known means (e.g., two dimensional linear regression) from the two input points.

When the vehicle is in forward flight, the effect of the horizontal drag force on the coning angle must also be compensated for in the weight calculation logic 32. The horizontal drag force is a force exerted by the air on the front surface area of the fuselage when the vehicle is in forward horizontal flight that requires the rotor to produce more rotor thrust to achieve the same speed than would be required given no horizontal drag, thereby affecting the coning angle.

Calibration of horizontal drag is performed, as is known, in level unaccelerated forward flight. The aircraft is weighed prior to calibration and adjusted by flight test instrumentation for fuel consumption during the test. Calibration is performed by plotting the actual weight of the vehicle against the ideal weight calculated by eqs. 3 and 4 at various different rotor speeds (e.g., 95%, 100%, and 105%), at various different vehicle weights (e.g., three different weights from 6,000 to 10,000 lbs) induced by placing weights in the vehicle, and at various different forward airspeeds (e.g., 60, 80, 100, 120, 140, and 150 knots). Different values or more values of rotor speed, vehicle weight, and airspeed may be used if desired.

The ideal weight calculated by eqs. 3 and 4 is corrected for horizontal drag by the weight calculation logic 32 of FIG. 1 using the measured rotor speed signal on the line 36, forward airspeed on the line 40, and a the trivariate (three inputs one output) table look-up derived from the aforementioned horizontal drag calibration of the vehicle. The inputs to the table are rotor speed, forward airspeed, and the ideal weight calculated by eqs. 3 and 4. The output of the table, actual vehicle weight corrected for horizontal drag, is linearly interpolated by known means (e.g. three dimensional linear regression) from the three input points.

The corrections for horizontal and vertical drag are mutually exclusive. The weight calculation logic selects between the two corrections based on the airspeed signal on the line 40. When the airspeed signal indicates an airspeed less than 40 knots, the weight calculation logic 32 will correct solely for vertical drag, and when the airspeed is greater than or equal to 40 knots, the logic will correct solely for horizontal drag. Correction of vertical and horizontal drag by the weight calculation logic may also be implemented using mathematical equations which are curve fit to the calibration data, instead of table look-ups.

It should be understood by those skilled in the art that the vertical and horizontal drag correction tables will also correct for any other effects such as non-uniform blade weight distribution. Furthermore, it should be understood that corrections may not be required for vehicles where these effects are minimal or nonexistent.

An inhibit signal on a line 54 may also be input to the weight calculation logic 32 of FIG. 1. The inhibit signal may come from any device which is capable of determining when the vehicle is not in level flight or hover, e.g., "Regime Recognition" logic 56 described in U.S. Pat. No. 4,933,882. However, this input is not required to calculate weight. The inhibit signal is used to inhibit (i.e. disable) the weight calculation logic from calculating vehicle weight when the flight conditions would render the weight calculation inaccurate, e.g., flight conditions other than hover and forward level flight. Alternatively, a downstream system receiving the weight signal may also monitor flight conditions and ignore the weight signal from the weight calculation logic when appropriate, thereby allowing the weight calculation logic to calculate weight continuously and eliminating the need for the inhibit signal as an input to the logic 32.

Although the invention is illustrated in FIG. 1 as being implemented with the distance sensors mounted to measure the distance perpendicular to the vehicle centerline 23, the invention will work equally as well with one or more sensors mounted at known angles ($\alpha$) to the vehicle centerline 23 as illustrated in FIG. 3. In this configuration the vertical distance must be calculated from the known sensor mounting angle and the distance measured by the sensor. The vertical distance y may be calculated by the following relationship:

$$y = c \sin(\alpha) \quad (eq.\ 5)$$

where $\alpha$ is the sensor mounting angle relative to the vehicle centerline 23; c is the distance measured by the sensor; and y is the vertical distance that would be measured by a sensor mounted a horizontal distance 106 from the actual sensor. The mounting angle $\alpha$ must be set to a value large enough to allow the laser light from the sensor to strike each passing rotor blade at all expected coning angles. Mounting the sensor at an angle has the advantage of allowing the sensors to measure closer to the tip of the blade. Additionally, sensor mounting angles may be chosen to measure points on the blades that are the same horizontal distance to the rotor shaft for both sensors. This eliminates the need for horizontal distance correction (shown in eq. 1) prior to averaging the two vertical distances. One or both sensors may be mounted at known angles if desired.

It should be understood that instead of using a laser diode device, the invention will work equally as well with other known distance measuring devices employing photoelectric, ultrasonic, or infrared technology. However, the composition or surface paint of the blades must be tailored to match the backscatter requirements for the type of sensing device used.

Although the invention has been illustrated as being implemented using a helicopter with a single lifting rotor, the invention will work equally as well with a helicopter employing a plurality of lifting rotors, with each rotor having a set of distance sensors for weight measurement. Furthermore, instead of a helicopter, the invention may be used on any aircraft employing a plurality of articulated (free to flap up and down) main lifting rotor blades, e.g., a gyroplane, comprising a horizontal thrust device and a free spinning rotor in autorotation, such as the Fairey Aviation "Rotodyne".

Instead of being implemented in dedicated hardware as described herein, all of the functions of the present invention relating to the weight calculation logic will likely be implemented in software by suitable programming of a digital computer, such as U.S. Pat. No. 4,270,168, and likely be one of many functions performed by one of the computers on a helicopter, such as an electronic flight control or electronic engine control computer.

Although the invention has been described and illustrated with respect to exemplary embodiments thereof, it should be understood by those skilled in the art that various changes, omissions and additions may be made without departing from the spirit and the scope of the invention.

We claim:

1. A weight measurement system for a helicopter having a plurality of main rotor blades above a fuselage that are driven by a rotor shaft, all the blades being connected at one end at a rotor hub, comprising:
 a plurality of noncontacting distance measuring sensors disposed near said fuselage each for measuring the distance from said sensors to said rotor blades that does not require physical touching of said rotor blades, and each for providing distance signals indicative of the distance between said fuselage and said rotor blades;
 a rotor speed sensor responsive to the rotational speed of said rotor blades for providing a rotor speed signal indicative of said rotational speed of said rotor blades; and
 weight signal processing means for providing a weight signal indicative of the weight of said helicopter in response to said distance signals and said rotor speed signal.

2. Apparatus of claim 1:
 further comprising an airspeed sensor for measuring the forward airspeed of said helicopter and for providing an airspeed signal indicative thereof; and
 wherein said weight signal processing means further comprises means responsive to said rotor speed signal and said airspeed signal for providing a first corrected weight signal corrected for the effects of horizontal drag, responsive to said rotor speed signal for providing a second corrected weight signal corrected for the effects of vertical drag, and responsive to said airspeed signal for providing said weight signal either as said first corrected weight signal or said second corrected weight signal, alternatively.

3. Apparatus of claim 1, wherein said distance measuring sensors comprises at least one laser diode device.

4. Apparatus of claim 1, further comprising means for selectively providing an inhibit signal to prevent said signal processing means from providing said weight signal when predetermined vehicle conditions exist.

5. Apparatus of claim 1, wherein said distance measuring sensors comprises at least one an optical sensor.

6. Apparatus of claim 1, wherein said weight signal processing means comprises means responsive to said rotor speed signal for providing said weight signal corrected for effects of vertical drag.

7. Apparatus of claim 6, wherein said weight signal processing means provides predetermined vertical drag calibration data and provides said weight signal corrected for vertical drag using said predetermined vertical drag data.

8. Apparatus of claim 1:
 further comprising an airspeed sensor for measuring the forward airspeed of said helicopter and for providing an airspeed signal indicative thereof; and
 wherein said weight signal processing means comprises means for alternatively providing said weight signal either corrected for the effects of horizontal drag in response to said rotor speed signal and said airspeed signal or corrected for the effects of vertical drag in response to said rotor speed signal.

9. Apparatus of claim 8, wherein said weight signal processing means provides predetermined horizontal drag calibration data and provides said weight signal corrected for horizontal drag using said predetermined horizontal drag data.

10. Apparatus of claim 1, wherein said weight signal processing means comprises means for averaging each of said distance signals to cancel effects of blade tracking.

11. Apparatus of claim 10:
 wherein each of said distance measuring sensors is located a predetermined vertical distance from the rotor hub; and
 wherein said weight signal processing means comprises means for compensating for said predetermined vertical distance of each of said distance measuring sensors and for providing a corresponding compensated distance signal indicative thereof.

12. Apparatus of claim 11, wherein said weight signal processing means comprises means, responsive to said compensated distance signal, for averaging each of said compensated distance signals together to cancel effects of vehicle pitch and rotor tilt, thereby providing a single average compensated distance signal to be used to calculate the weight of said helicopter.

13. Apparatus of claim 10:
 wherein each of said distance measuring sensors is located a predetermined horizontal distance from the rotor shaft; and
 wherein said weight signal processing means comprises rescaling means for rescaling at least one of said distance signals to a common horizontal distance from the rotor shaft when said predetermined horizontal distance is not the same for each of said distance sensors, and for providing a corresponding rescaled distance signal indicative thereof.

14. Apparatus of claim 13, wherein said rescaling is not performed on one of said distance signals from a corresponding one of said distance sensors having said predetermined horizontal distance being different from the other of said predetermined horizontal distances.

15. Apparatus of claim 13, wherein said weight signal processing means comprises means, responsive to said rescaled distance signal, for averaging each of said compensated distance signals together to cancel effects of vehicle pitch and rotor tilt, thereby providing a single averaged rescaled distance signal to be used to calculate the weight of said helicopter.

* * * * *